US012771527B2

(12) United States Patent
Kadam et al.

(10) Patent No.: US 12,771,527 B2
(45) Date of Patent: Oct. 20, 2026

(54) MULTI-TENANCY PROTECTION FOR ACCELERATORS

(71) Applicant: Intel Corporation, Santa Clara, CA (US)

(72) Inventors: Akshay Kadam, Bangalore (IN); Sivakumar B, Bangalore (IN); Lawrence Booth, Jr., San Mateo, CA (US); Niraj Gupta, Bangalore (IN); Steven Tu, Fountain Hills, AZ (US); Ricardo Becker, Phoenix, AZ (US); Subba Mungara, Chandler, AZ (US); Tuyet-Trang Piel, Chandler, AZ (US); Mitul Shah, Bangalore (IN); Raynald Lim, Klang (MY); Mihai Bogdan Bucsa, Timisoara (RO); Cliodhna Ni Scanaill, Broadford (IE); Roman Zubarev, Nizhniy Novgorod (RU); Dmitry Budnikov, Nizhny Novgorod (RU); Lingyun Zhu, Shanghai (CN); Yi Qian, Shanghai (CN); Stewart Taylor, Los Altos, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 18/785,435

(22) Filed: Jul. 26, 2024

(65) Prior Publication Data

US 2024/0396711 A1 Nov. 28, 2024

Related U.S. Application Data

(63) Continuation of application No. 17/569,488, filed on Jan. 5, 2022, which is a continuation of application No. PCT/CN2021/082931, filed on Mar. 25, 2021.

(51) Int. Cl.

| | |
|---|---|
| *H04L 9/06* | (2006.01) |
| *G06F 9/455* | (2018.01) |
| *H04L 9/08* | (2006.01) |

(52) U.S. Cl.

CPC .......... *H04L 9/065* (2013.01); *G06F 9/45558* (2013.01); *H04L 9/0819* (2013.01);

(Continued)

(58) Field of Classification Search

CPC . H04L 9/1065; H04L 63/1416; H04L 63/029; H04L 63/1425; H04L 63/20; H04L 67/148; G06F 9/45558; G06F 9/45566

(Continued)

(56) References Cited

U.S. PATENT DOCUMENTS

| | | | |
|---|---|---|---|
| 7,212,634 | B2 | 5/2007 | Briscoe |
| 9,767,317 | B1 | 9/2017 | Chakrovorthy |

(Continued)

FOREIGN PATENT DOCUMENTS

| | | | | |
|---|---|---|---|---|
| CA | 2318267 C | * 12/2005 | ............. | H04L 67/59 |
| CN | 106462439 A | * 2/2017 | ......... | G06F 21/6281 |

(Continued)

OTHER PUBLICATIONS

International Patent Application No. PCT/CN2021/082931 "International Search Report and Written Opinion" mailed May 28, 2021, 8 pages.

(Continued)

*Primary Examiner* — Khanh Q Dinh

(74) *Attorney, Agent, or Firm* — JAFFERY WATSON HAMILTON & DESANCTIS LLP

(57) ABSTRACT

An accelerator includes a memory, a compute zone to receive an encrypted workload downloaded from a tenant application running in a virtual machine on a host computing system attached to the accelerator, and a processor subsys- (Continued)

tem to execute a cryptographic key exchange protocol with the tenant application to derive a session key for the compute zone and to program the session key into the compute zone. The compute zone is to decrypt the encrypted workload using the session key, receive an encrypted data stream from the tenant application, decrypt the encrypted data stream using the session key, and process the decrypted data stream by executing the workload to produce metadata.

20 Claims, 9 Drawing Sheets

(52) U.S. Cl.
CPC ................ *G06F 2009/4557* (2013.01); *G06F 2009/45583* (2013.01); *G06F 2009/45587* (2013.01)

(58) Field of Classification Search
USPC .......................................... 709/220, 224–229
See application file for complete search history.

(56) References Cited

U.S. PATENT DOCUMENTS

| | | | | |
|---|---|---|---|---|
| 9,838,361 | B2 | 12/2017 | Birger | |
| 9,894,067 | B1 | 2/2018 | Mandadi | |
| 9,900,160 | B1 | 2/2018 | Barbour | |
| 10,182,044 | B1 | 1/2019 | Praus | |
| 10,277,569 | B1 | 4/2019 | Barbour | |
| 10,423,791 | B2 * | 9/2019 | Wells | G06F 21/53 |
| 10,951,652 | B1 | 3/2021 | Sharifi Mehr | |
| 11,042,452 | B1 | 6/2021 | McNutt | |
| 11,494,219 | B2 | 11/2022 | Pascual | |
| 11,601,434 | B1 | 3/2023 | Hornsby et al. | |
| 11,734,278 | B2 | 8/2023 | Vattem et al. | |
| 11,929,988 | B2 | 3/2024 | Gupta et al. | |
| 12,045,212 | B2 | 7/2024 | Gardner | |
| 12,284,162 | B2 | 4/2025 | Syrivelis et al. | |
| 2014/0013123 | A1 | 1/2014 | Khazan | |
| 2014/0157004 | A1 * | 6/2014 | Park | G06F 9/45533 713/189 |
| 2015/0200920 | A1 | 7/2015 | Norton | |
| 2015/0215293 | A1 | 7/2015 | Ellison et al. | |
| 2016/0241393 | A1 * | 8/2016 | Boenisch | H04L 9/3271 |
| 2017/0086325 | A1 | 3/2017 | Connor et al. | |
| 2017/0372061 | A1 * | 12/2017 | Penzin | G06F 9/45558 |
| 2018/0145828 | A1 | 5/2018 | Coon | |
| 2018/0183793 | A1 * | 6/2018 | Mandadi | H04L 63/20 |
| 2018/0184297 | A1 | 6/2018 | Mohamed et al. | |
| 2018/0314827 | A1 | 11/2018 | Wells et al. | |
| 2019/0044927 | A1 * | 2/2019 | Sood | G06F 9/5077 |
| 2019/0052612 | A1 | 2/2019 | Norton | |
| 2019/0363887 | A1 * | 11/2019 | De Lima Junior | G06F 12/1408 |
| 2020/0322661 | A1 | 10/2020 | Korte | |
| 2021/0064765 | A1 * | 3/2021 | Lapworth | H04L 67/10 |
| 2021/0089340 | A1 * | 3/2021 | Chatterjee | H04L 63/0428 |
| 2021/0263759 | A1 * | 8/2021 | Pascual | H04L 9/3263 |
| 2023/0246813 | A1 | 8/2023 | Tsirkin | |

FOREIGN PATENT DOCUMENTS

| | | | | |
|---|---|---|---|---|
| CN | 109558740 | A | 4/2019 | |
| CN | 111797437 | A | 10/2020 | |
| DE | 102022100344 | A1 | 9/2022 | |
| GB | 2546801 | A | 8/2017 | |
| JP | 2019517184 | A * | 6/2019 | G06F 21/10 |
| KR | 101574188 | B1 | 12/2015 | |
| WO | 2018175140 | A1 | 9/2018 | |
| WO | 2022198551 | A1 | 9/2022 | |

OTHER PUBLICATIONS

Final Office Action issued in U.S. Appl. No. 17/569,488 mailed Aug. 26, 2024, 9 pages.

Non-Final Office Action issued in U.S. Appl. No. 17/569,488 mailed Mar. 10, 2025, 10 pages.

Final Office Action issued in U.S. Appl. No. 17/569,488 mailed Sep. 25, 2025, 12 pages.

Non-Final Office Action issued in U.S. Appl. No. 17/569,488 mailed Apr. 7, 2026, 11 pages.

U.S. Appl. No. 17/569,488 Notice of Allowance, mailed Aug. 14, 2026, 8 pgs.

* cited by examiner

100

MULTI-TENANCY PROTECTION FOR ACCELERATORS

RELATED APPLICATIONS

This Application is a continuation of and claims the benefit of and priority to U.S. application Ser. No. 17/569,488, entitled MULTI-TENANCY PROTECTION FOR ACCELERATORS, by Akshay Kadam, et al., filed Jan. 5, 2022, now pending, which is a continuation of co-pending International Patent Application No. PCT/CN2021/082931, filed Mar. 25, 2021, the entire contents of which are incorporated herein by reference.

FIELD

Embodiments relate generally to cloud computing environments, and more particularly, to protecting multiple tenants when sharing access to an accelerator.

BACKGROUND

In most modern cloud computing environments, the computing infrastructure is shared between multiple users, commonly referred to as tenants. Since each tenant has its own programs (e.g., code) and data, the program execution environment and memory storing this code and data must be strictly isolated such that one tenant is not able to read or modify the code and/or data of another tenant. This deters theft of the tenant's code and/or data and deters a potentially malicious tenant from subverting the use of the computing resources of another tenant. This isolation is often achieved by virtualizing the computing resources of the cloud computing environment such that each tenant is mapped to specific virtual machine (VM). Hardware mechanisms embodied within processor, memory and input/output (I/O) systems enforce these isolation boundaries, with a software component known as a hypervisor establishing and managing these boundaries. The hypervisor runs at a higher privilege than other software in the computing infrastructure and is trusted by virtue of its implementation simplicity (as compared to a traditional operating system (OS)), based in part on its limited functionality of establishing and managing isolation boundaries.

This approach works well on centralized computing systems such as those found in typical client and server systems. However, when a compute task of a tenant is offloaded to a compute accelerator connected to the central computing system (often called the host computing system), via an interconnect, maintaining these isolations becomes problematic.

BRIEF DESCRIPTION OF THE DRAWINGS

So that the manner in which the above recited features of the present embodiments can be understood in detail, a more particular description of the embodiments, briefly summarized above, may be had by reference to embodiments, some of which are illustrated in the appended drawings. It is to be noted, however, that the appended drawings illustrate only typical embodiments and are therefore not to be considered limiting of its scope. The figures are not to scale. In general, the same reference numbers will be used throughout the drawings and accompanying written description to refer to the same or like parts.

DETAILED DESCRIPTION

Embodiments described herein provide an efficient way to isolate code and/or data of an application executing within a host computing system when at least a portion of the code and data is offloaded for processing by an attached accelerator computing device. This is achieved at least in part by using cryptographically secure communications between the host computing system and accelerator, an Isolated Memory Regions (IMRs) infrastructure and a Trusted Execution Environment (TEE) in the accelerator, and secure compute zones in the accelerator associated with selected tenants.

Figure 1:
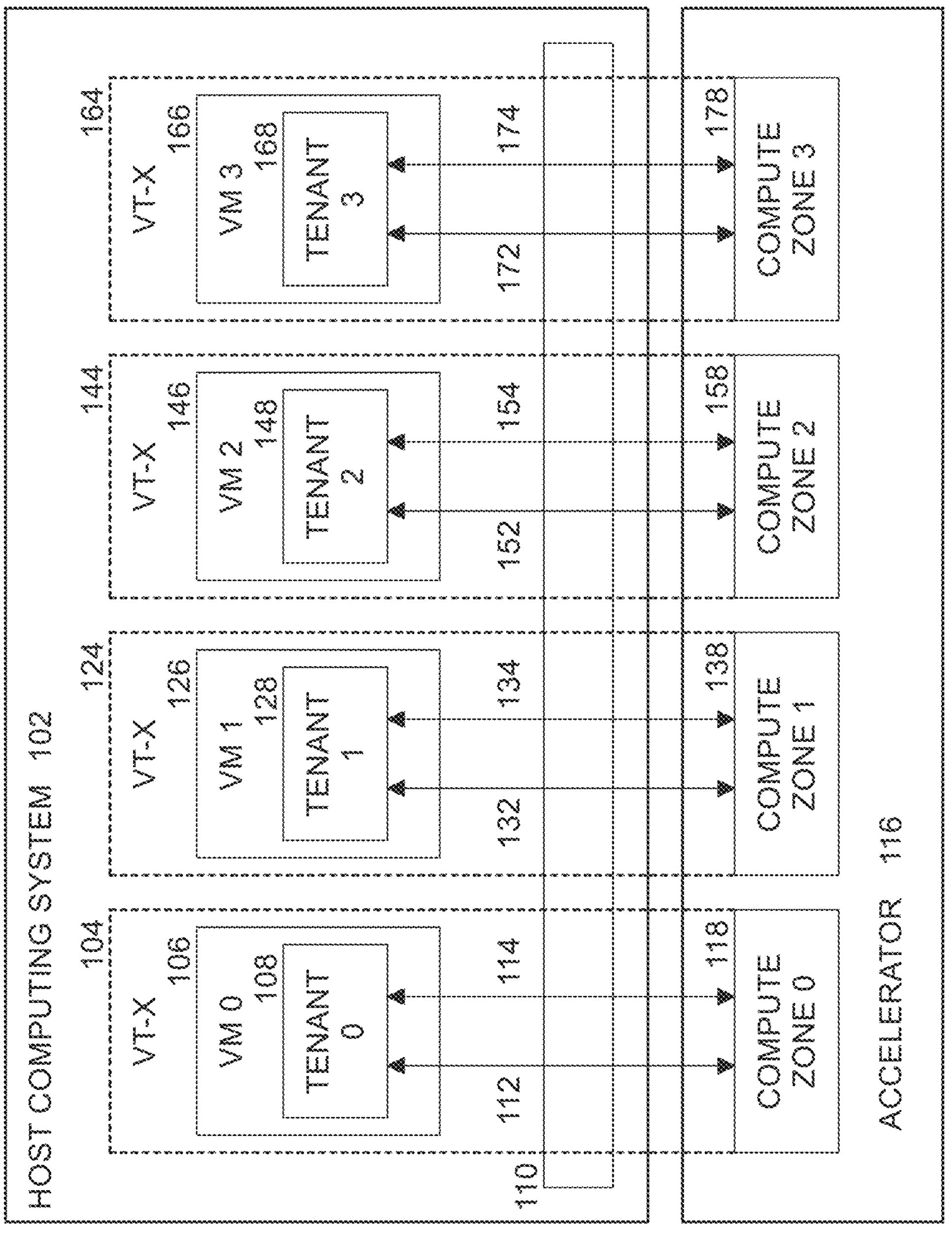
FIG. 1 illustrates a multi-tenant protection system according to some embodiments.

FIG. 1 illustrates a multi-tenant protection system 100 according to some embodiments. System 100 includes at least one host computing system 102 communicatively coupled to at least one accelerator 116. In some examples, host computing system 102, may include, but is not limited to, a server, a server array or server farm, a web server, a network server, an Internet server, a workstation, a minicomputer, a mainframe computer, a supercomputer, a network appliance, a web appliance, a distributed computing system, multiprocessor systems, processor-based systems, a personal computer, or any combination thereof. Host computing system 102 comprises a plurality of virtual machines (VMs) such as VM 0 106, VM 1 126, VM 2 146, and VM 3 166, running in virtual technology computing environments (e.g., known as VT-x) such as VT-x 104, 124, 144, and 164, in some embodiments. VT-x includes well known hardware-assisted virtualization capabilities running on processors commercially available from Intel Corporation. In other embodiments, hardware virtualization support provided by AMD-V, commercially available from Advanced Micro Devices, Inc. (AMD), may also be used. Each VM includes one or more tenants, such as tenant 0 108, tenant 1 128, tenant 2 148, and tenant 3 168. Each tenant comprises one or more applications including code and data. Although four VMs and four tenants are shown in the simple example of FIG. 1, in embodiments any number of VMs may be running on host computing system 102, and any number of tenants may be running in any given VM, in any combination.

Host computing system 102 communicates with accelerator 116 over bus 110. In an embodiment, bus 110 is a peripheral component interconnect express (PCI-e) high speed serial computer bus as described at pcisig.com. In other embodiments, other busses may be used. In one embodiment, communication over bus 110 is protected by transport layer security (TLS) (e.g., TLS over PCI-e), a cryptographic protocol to provide communications security over a computer network.

Accelerator 116 is used to offload at least some processing tasks (also known as workloads) from host computing system 102 to improve the overall efficiency of system 100. Accelerator 116 comprises any current or future developed single- or multi-core processor or microprocessor, such as: one or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. In an embodiment, accelerator 116 is a processing system designed to efficiently compute tasks relating to artificial intelligence (AI), machine learning (MIL), deep learning, inference processing, and/or image processing. Although in FIG. 1 only one accelerator 116 is shown coupled to host computing system 102, in other embodiments any number of accelerators may be coupled to host computing system 102, in any combination.

In this example accelerator 116 comprises four compute zones—compute zone 0 118, compute zone 1 138, compute zone 2 158, and compute zone 3 178. As used herein, a compute zone includes data processing circuitry for performing one or more computing tasks offloaded from host computing system 102. In other examples, any number of compute zones may be included in accelerator 116. Compute zones operate in parallel in the accelerator to efficiently perform computing tasks. In embodiments, each compute zone is isolated from other compute zones; that is, one compute zone cannot access or affect the processing and/or data of other compute zones.

In one embodiment wherein bus 110 is a PCI-e bus, the PCI-e bus provides eight physical PCI-e functions (PFs), labeled 112, 114, 132, 134, 152, 154, 172, and 174 in FIG. 1. Communications over the physical functions are protected by VT-x 104, 124, 144, and 164, respectively. In this example, PF 0 112 and PF 1 114 are coupled between tenant 0 108 and compute zone 0 118, PF 2 132 and PF 3 134 are coupled between tenant 1 128 and compute zone 1 138, PF 4 152 and PF 5 154 are coupled between tenant 2 148 and compute zone 2 158, and PF 6 172 and PF 7 174 are coupled between tenant 3 168 and compute zone 3 178. In other embodiments, there may be any number of PFs, as supported by bus 110 and accelerator 116. In other examples, PFs may be coupled between tenants and compute zones in any combination. In various embodiments, tenants may be mapped to compute zones in any combination. For example, tenant 0 108 may be mapped to compute zone 0 118, tenant 1 128 may be mapped to compute zone 1 138, and tenant 2 148 may be mapped to compute zone 2 158 and compute zone 3 178. In another example, tenant 0 108 may be mapped to compute zone 0 118, and tenant 3 168 may be mapped to compute zone 1 138, compute zone 2 158, and compute zone 3 178. In yet another example, tenant 1 128 may be mapped to compute zone 0 118, compute zone 1 138, compute zone 2 158, and compute zone 3 178.

Figure 2:
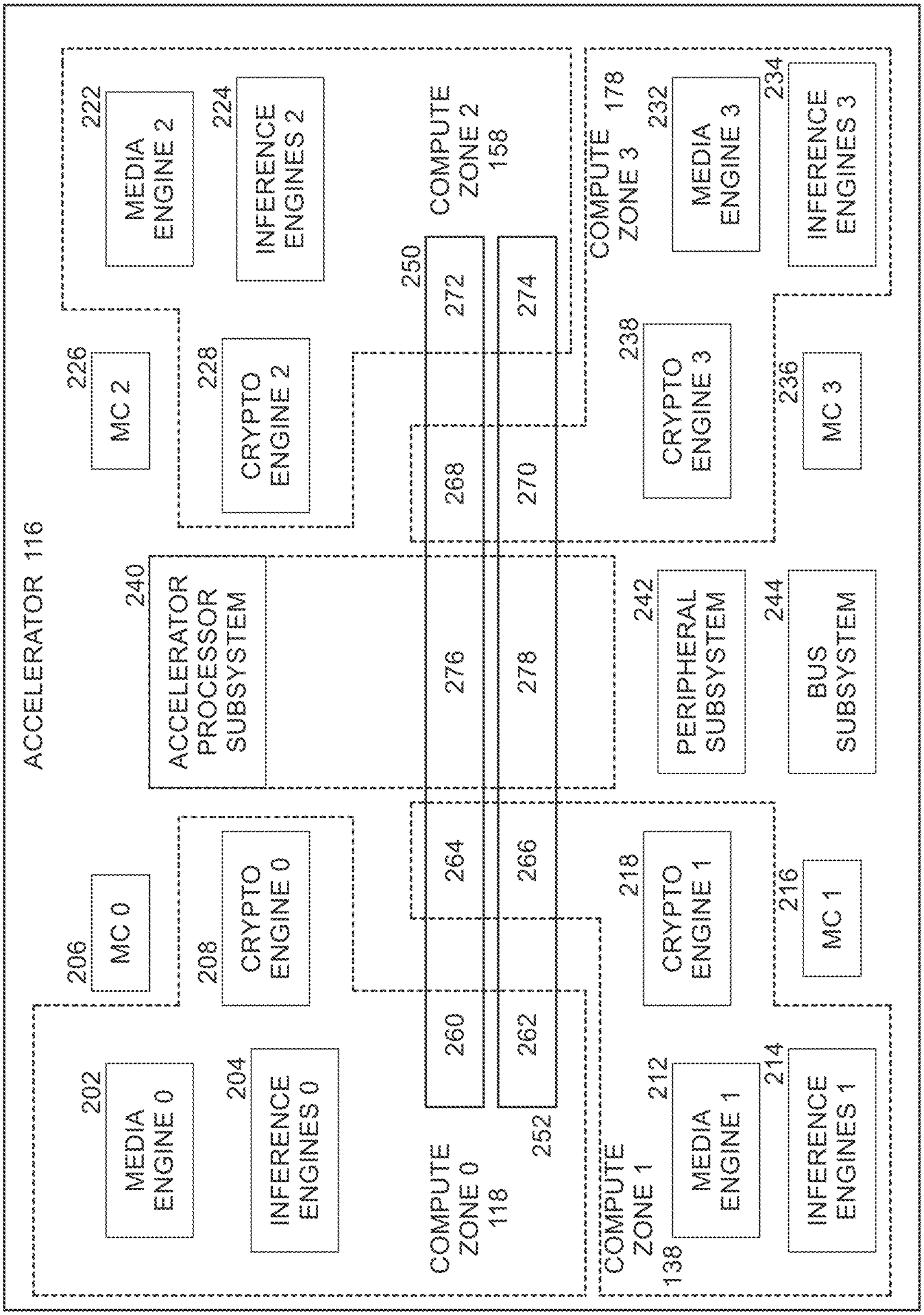
FIG. 2 is a diagram of an accelerator according to some embodiments.

FIG. 2 is a diagram of accelerator 116 according to some embodiments. Multiple media and inference computing resources on the accelerator are grouped into four clusters that can operate in parallel. Each cluster, called a compute zone herein (such as compute zone 0 118, compute zone 1 138, compute zone 2 158 and compute zone 3 178), comprises a media engine, one or more inference engines, a cryptographic engine, and regions of protected memory. For example, compute zone 0 118 comprises media engine 0 202, inference engines 0 204, crypto engine 0 208, and protected memory region 260 of memory 250 and protected memory region 262 of temporary memory 252; compute zone 1 138 comprises media engine 1 212, inference engines 1 214, crypto engine 1 218, and protected memory region 264 of memory 250 and protected memory region 266 of temporary memory 252; compute zone 2 128 comprises media engine 2 222, inference engines 2 224, crypto engine 2 228, and protected memory region 272 of memory 250 and protected memory region 274 of temporary memory 252; and compute zone 3 138 comprises media engine 3 232, inference engines 3 234, crypto engine 3 238, and protected memory region 268 of memory 250 and protected memory region 270 of temporary memory 252. Each compute zone is exposed to host computing system 102 over bus 110 via one or more dedicated PFs. Each compute zone processes 'data plane' operations on data received from host computing system 102.

In an embodiment, memory 250 comprises a dynamic random-access memory (DRAM), and temporary memory 252 comprises a high speed 'near' static random-access memory (SRAM). Access to memory 250 and temporary memory 252 by compute zones is provided by memory controllers (MCs) MC 0 206, MC 1 216, MC 2 226 and MC3 236. Each compute zone uses a MC to access the memories. For example, compute zone 0 118 accesses the memories using MC 0 206, compute zone 1 138 accesses the memories using MC 1 216, compute zone 2 158 accesses the memories using MC 2 226, and compute zone 3 178 accesses the memories using MC 3 236.

Media engines 202, 212, 222, and 232 provide media processing operations such as encoding video data, decoding video data, compressing video data, and decompressing video data.

Inference engines 204, 214, 224, and 234 provide one or more artificial intelligence (AI), machine learning, and/or deep learning data processing operations. These operations include object detection, object tracking, object classification, labelling, etc. For example, a data processing operation could include a process that tracks a specific red vehicle as it moves across the field of view of a surveillance camera. Another example would be the ability to detect the location of a particular vehicle using a license plate detection process.

Crypto engines 208, 218, 228, and 238 provide cryptographic processing operations in hardware. These operations may include encryption, decryption, hashing, integrity checking, authentication, signing, and/or signature verification.

Selected regions of memory 250 and temporary memory 252 associated with each compute zone are isolated using Isolated Memory Region (IMR) registers. IMRs are fence registers which are securely configured to only allow memory read/write accesses from a specific compute zone (and related entities, e.g., other bus controllers in the system such as PCIe DMA engines (in 242), generic DMA engines and other peripherals (in 242) and accelerator processor subsystem 240). This prevents access by one compute zone to data from another compute zone. Thus, the data stored in a compute zone's protected region of memory 250 is isolated from other data of other compute zones as well as other HW devices in the accelerator such as a PCIe controller (in 242) and accelerator processor subsystem 240. This increases the security provided by the accelerator.

Accelerator 116 includes bus subsystem 244 for communicating with host computing system 102 over bus 110, and peripheral subsystem 242 for communicating with any peripherals attached to accelerator 116 (not shown in FIG. 2).

Accelerator processor subsystem 240 includes one or more processors to execute code for accelerator 116. In an embodiment, the one or more processors comprises an ARM-based compute complex (according to a specification by ARM, Ltd.), that supports the ARM TrustZone Trusted Execution Environment (TEE) for secure computing operations, including setting of IMRs. ARM TrustZone technology is a system-on-chip (SoC) and central processing unit (CPU) system-wide approach to security with hardware-enforced isolation to establish secure end points and a device root of trust. This compute complex operates like a 'control-plane' for the 'data-plane' processing performed by the compute zones and controls overall processing of accelerator 116.

Figure 3:
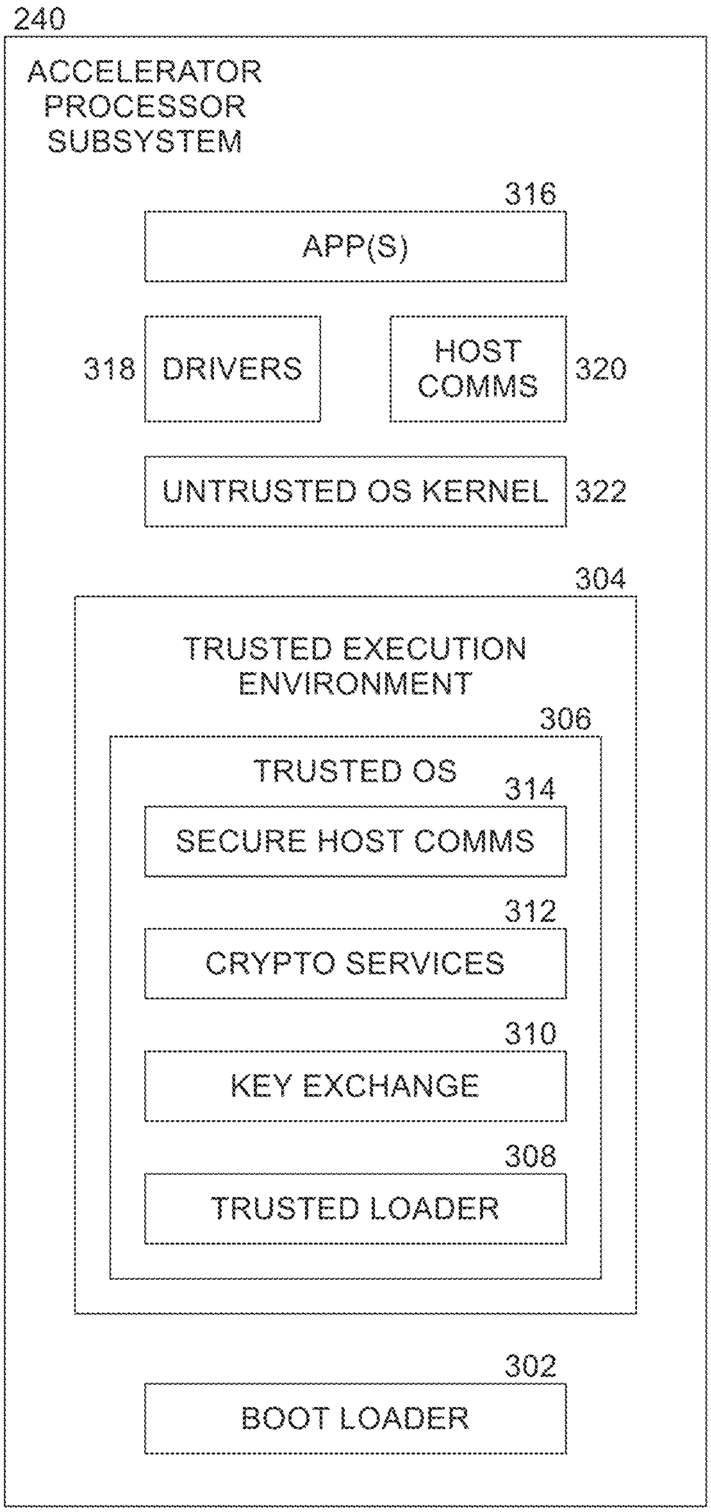
FIG. 3 is a diagram of a software stack of a processor subsystem of an accelerator according to some embodiments.

FIG. 3 is a diagram of a software stack of a processor subsystem 240 of accelerator 116 according to some embodiments. Accelerator 116 includes general purpose processor subsystem 240 to provide boot time security functions, a trusted execution environment (TEE), communications with host computing system 102 and functions in compute zones 118, 138, 158, and 178, and control over local functions (e.g., within accelerator processor subsystem 240). Boot loader 302 is loaded at the start of the boot process for accelerator 116. A security role of boot loader 302 is to set the hardware configuration security for compute zone memory firewalls (e.g., EVIRs) and to authenticate TEE 304. The configuration includes setting the protected memory regions for the compute zones (e.g., set protected memory region 260 and 262 for compute zone 0 118, and so on). General purpose memory 250 and temporary memory 252 is also assigned at this time. In addition, one or more isolated regions 276 for memory 250 and one or more isolated regions 278 for temporary memory 252 are set for use by TEE 304. TEE 304 contains trusted operating system (OS) 306, which includes trusted loader 308, key exchange function 310, crypto services 312, and secure host communications (comms) 314. Trusted loader 308 authenticates untrusted OS kernel 322, accelerator drivers 318, and untrusted host comms 320. Key exchange function 310 performs local key generation or key exchange functions with host computing system 102. These keys may be stored locally in TrustZone TEE 304 or loaded into key storage of one or more the crypto engines (e.g., crypto engine 0 208, crypto engine 218, crypto engine 2 228, and/or crypto engine 3 238. Crypto services 312 provide general purpose cryptographic functions implemented in software such as encryption, decryption, hashing, integrity checking, authentication, signing, and signature verification. Secure host comms 314 provides secure communications with host computing system 102. Accelerator processor subsystem 240 also may include one or more applications (app(s)) 316 executed by one or more ARM processors (not shown).

Figure 4:
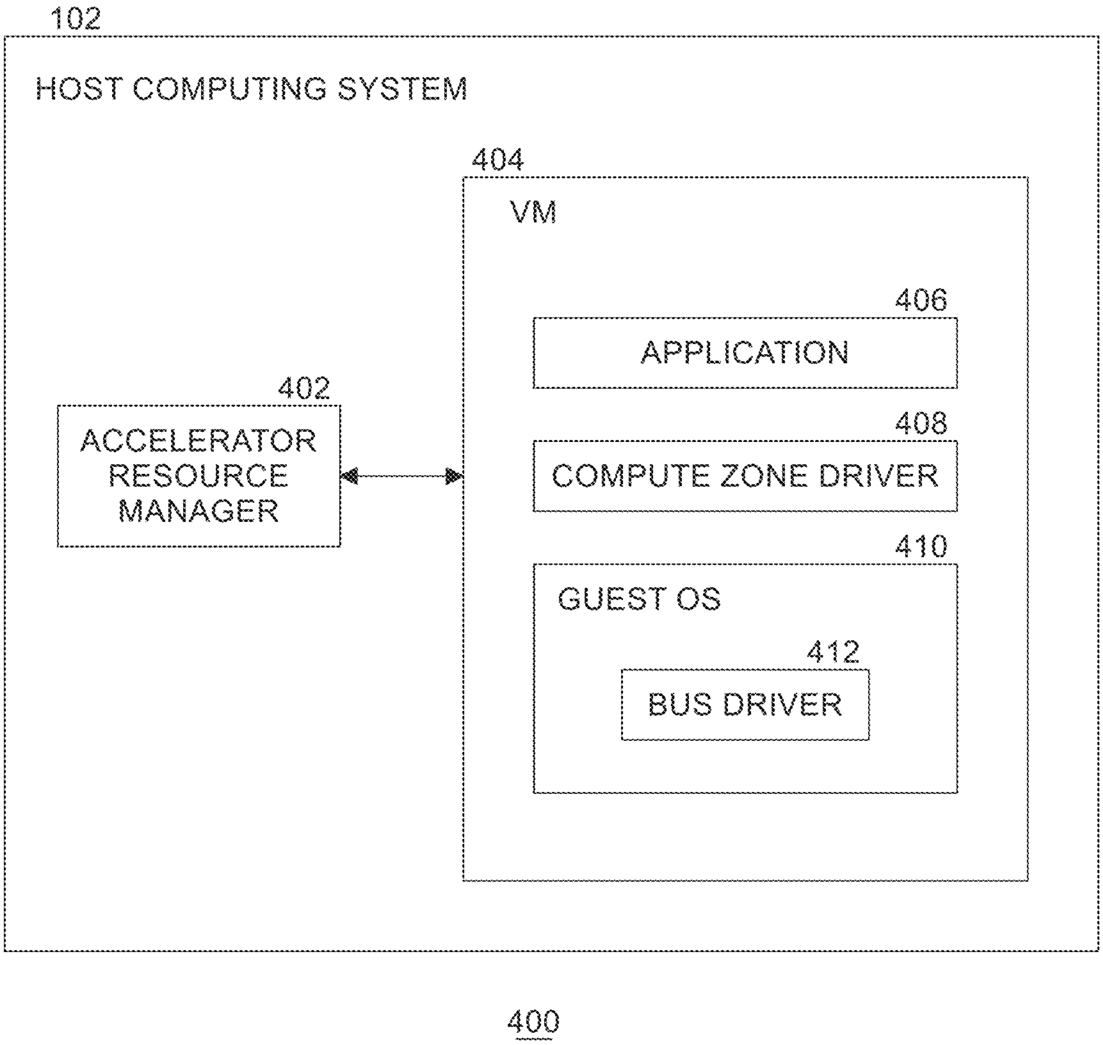
FIG. 4 is a diagram of a software stack of a host computing system according to some embodiments.

FIG. 4 is a diagram of a software stack 400 of a host computing system 102 according to some embodiments. Accelerator resource manager 402 assigns compute zones to VMs of tenants by mapping physical functions (PFs) of bus 110 (e.g., a PCIe bus) to the VMs. Accelerator resource manager 402 also starts the VMs. The accelerator resource manager also keeps track of which compute zones of which accelerator (in a multi-accelerator system) are currently allocated to tenants and which ones are idle. Accelerator resource manager 402 performs various housekeeping related tasks such as monitoring the temperature of the accelerator and taking corrective action if the temperature exceeds certain limits, etc.

Each VM 404 runs a least one tenant application 406 and a guest OS 410. Guest OS 410 includes bus driver 412 to control communications over bus 110 to one or more compute zones on accelerator 116. Each VM 404 that interacts with one or more compute zones on the accelerator includes a compute zone driver 408 to control communications between the tenant's application 406 and assigned compute zone(s). The compute zone driver is also responsible for the confidentiality and integrity of data exchanged between application 406 and accelerator 116 over PCIe interconnect 110.

Figure 5A:
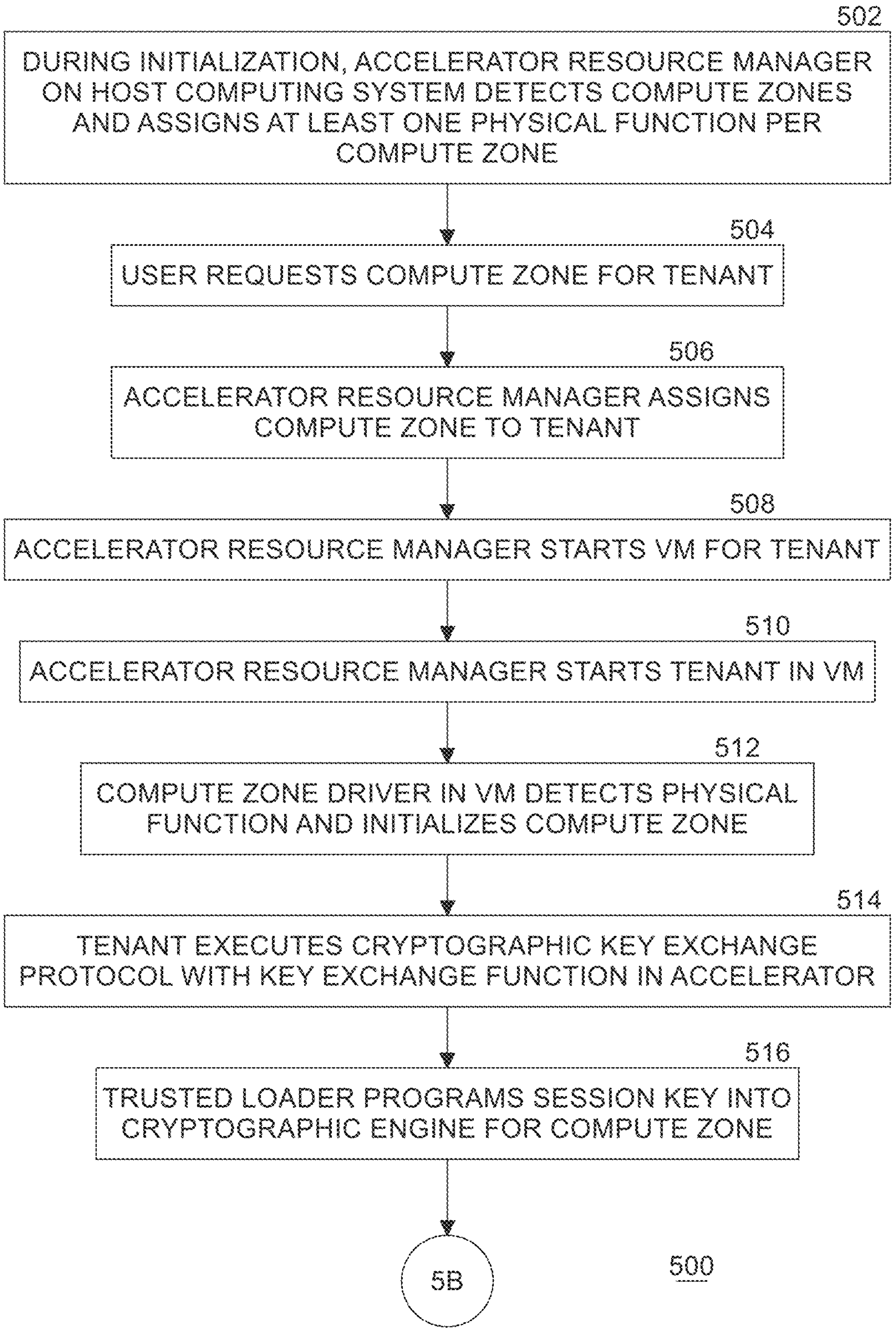
FIGS. 5A and 5B are flow diagrams of multi-tenant protection processing according to some embodiments.
Figure 5B:
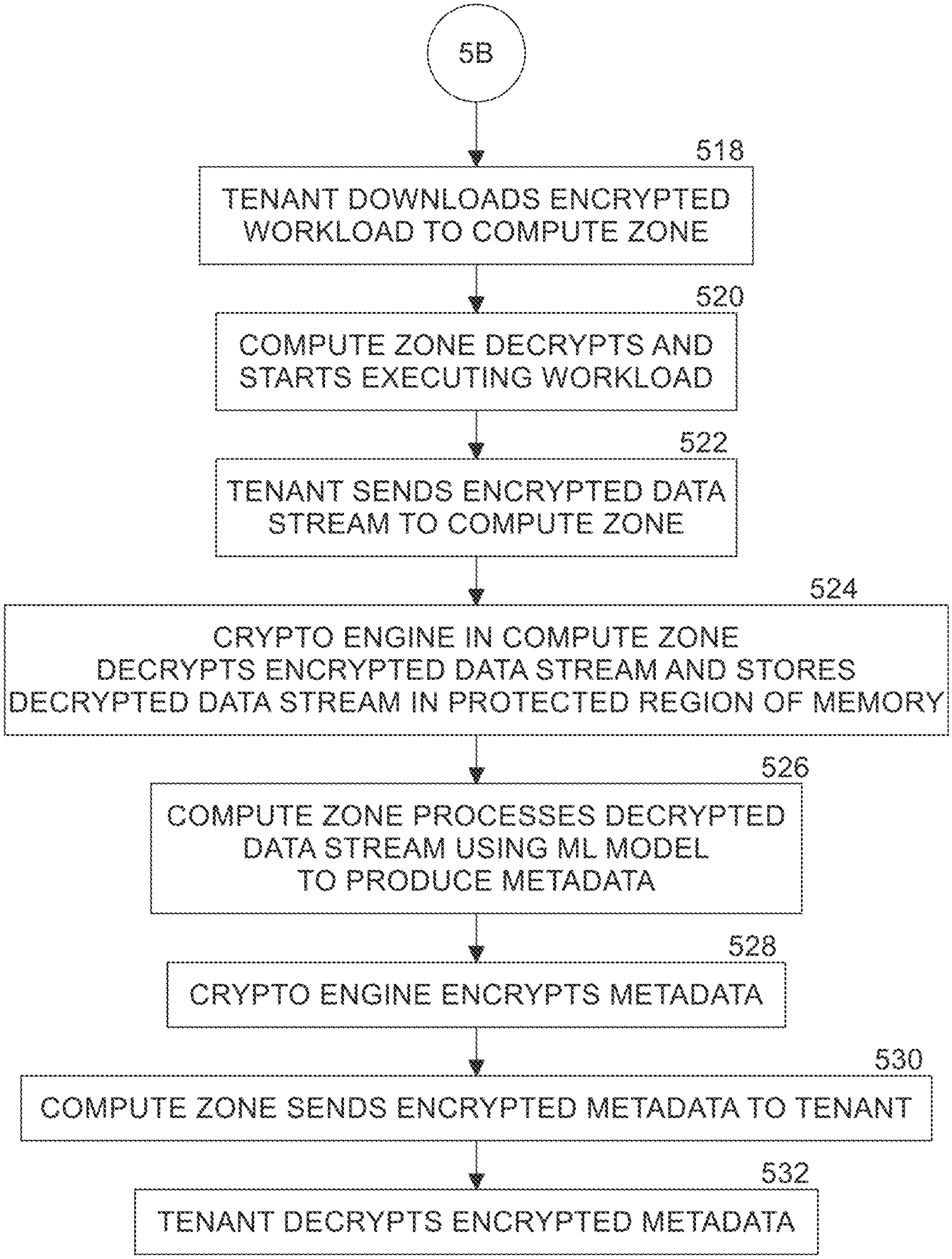

FIGS. 5A and 5B are flow diagrams of multi-tenant protection processing 500 according to some embodiments. Multiple tenants 108, 128, 148, and 168 can execute in parallel on host computing system 102. All tenant resources (e.g., code and data for application 406) on the host computing system are protected from one another via VM-based isolation mechanisms. Tenant software within a VM (such as tenant 0 108 in VM 0 106 and application 406) communicates with one or more compute zones in the accelerator (such as compute zone 0 118) in a secure manner via the tenant's assigned PF using the compute zone driver 408 in the tenant's VM.

At block 502, during initialization of host computing system 102, accelerator resource manager 402 on the host computing system detects each attached accelerator 116, detects the compute zones (e.g., 118, 138, 158, and 178) in each accelerator, and assigns at least one PF for each compute zone (e.g., PFs 112, 114, 132, 134, 152, 154, 172, and 174). At block 504, a user of host computing system 102 requests one or more compute zones to be assigned to a tenant. In an embodiment, the request is read from a configuration file on the host computing system that maps PFs to VMs before the VMs are started by the host. In another embodiment, the request is received over a command line interface from a user (for example, from a system administrator of a cloud computing environment). In response, at block 506 accelerator resource manager 402 assigns the requested compute zone (if available) to the tenant (and to the tenant's VM). In an embodiment, a static configuration is used to map compute zones to tenants for a host computing system. In another embodiment, the mapping of compute zones to tenants is dynamic and may be changed during runtime. In an embodiment, A VM 404 is started as an empty shell and once up and running, a tenant is provisioned into the VM.

When a persistent memory (such as an embedded MultiMediaCard (eMMC) or other temporary memory 252) is not present on accelerator 116 (e.g., the accelerator is "flash-less"), host computing system 102 sends a link certificate and encrypted private configuration assets to TrustZone TEE 306 in accelerator processor subsystem 240. In some accelerators, this information resides in the persistent memory (e.g., temporary memory 252). The link certificate and encrypted private configuration assets are used by the accelerator to establish a secure communications link with the host computing system.

Accelerator resource manager 402 searches for available resources and assigns PFs associated with the requested compute zone to the tenant (and thus also to the VM). At block 508, accelerator resource manager 402 creates and starts a VM for the tenant. At block 510, the accelerator resource manager starts the tenant software within the VM. At block 512, compute zone driver 408 within the tenant's VM detects the one or more assigned PFs and instructs the accelerator to initialize the compute zone(s) assigned to the tenant (e.g., thus causing the initialization to be performed). Trusted loader 308 sets up the tenant boundaries in memory 250 and temporary memory 252 to prevent other tenants from accessing any data within the tenant's protected (and isolated) memory (for example, protected regions 260 and 262 for memory 250 and temporary memory 252, respectively, for compute zone 0 118). At block 514, the tenant executes a cryptographic key exchange protocol with key exchange function 310 in TrustZone TEE 304 in accelerator 116 and both sides of the key exchange protocol derive the same unique session key. The trusted loader at block 516 programs the newly derived session key specific to this tenant/compute zone combination into the cryptographic engine of the compute zone (for example, crypto engine 0 208 of compute zone 0 118 for communication with tenant 0 108 in VM 0 106).

All communications between the VM (for example, VM 0 106) on host computing system 102 and the compute zone (for example, compute zone 0 118) on accelerator 116 over the assigned PFs (e.g., 112, 114) is encrypted with this session key. Since the session key is known only to the tenant within the VM and the assigned compute zone, no other entity (either hardware (HW) or software (SW)) in the host computing system or the accelerator, or in the communications path between the host computing system and the accelerator, can access (e.g., steal) communications encrypted with this session key. In an embodiment, once programed into the crypto engine the session key cannot be read back out by any entity (either HW or SW) on accelerator 116 or host computing system 102. Processing then continues at block 518 on FIG. 5B via connector 5B.

At block 518, the tenant downloads an encrypted workload to the assigned compute zone (for example, tenant 0 108 downloads an encrypted workload to compute zone 0 118) via the assigned PFs (e.g., 112 or 114) over the encrypted communications link. At block 520, the compute zone decrypts the workload (for example, using the crypto engine 0 208 in compute zone 0 118 and the embedded session key) and starts executing the workload. The workload can be any one or more data processing tasks. Once the workload is running and ready to process data, at block 522 the tenant sends an encrypted data stream to the compute zone running the decrypted workload. In one embodiment, the data stream comprises a video data stream. The data stream has been previously encrypted by the tenant with the same session key used to encrypt the workload. This session key (embedded in the crypto engine) is also used by the crypto engine in the compute zone at block 524 to decrypt the received encrypted data stream and store the decrypted (e.g., plaintext) data stream in the protected region (e.g., 260) of memory 250 allocated to the compute zone. While in the protected region, the decrypted data stream cannot be accessed by other compute zones or untrusted software executing in accelerator processor subsystem 240 (e.g., untrusted apps 316).

At block 526, the compute zone processes the decrypted data stream to produce metadata. In an embodiment, metadata produced by the compute zone is stored in the protected region of memory 250 (e.g., protected region 260 for compute zone 0 118). During processing, the compute zone may store temporary data in the compute zone's protected region of temporary memory 252 (e.g., area 262 for compute one 0 118). In an embodiment, this temporary data is metadata. In an embodiment, the one or more inference engines of the compute zone are applied to the decrypted data stream (for example, inference engines 0 204 of compute zone 0 118). In an embodiment, the one or more inference engines comprise one or more machine learning (ML) models.

In an embodiment, the compute zone uses functions provided by a media engine (for example, media engine 0 202 of compute zone 0 118) to process the data stream prior to or after processing by the one or more inference engines. At block 528, the crypto engine in the compute zone (for example, crypto engine 0 208 of compute engine 0 118) encrypts the metadata using the embedded session key. At block 530, the compute zone sends the encrypted metadata over the encrypted communications link from the accelerator to the tenant on the host computing system. At block 532, the tenant decrypts the encrypted metadata. The tenant can then use the metadata (that is, the results of the accelerator's computation of the offloaded workload) for any purposes as needed.

In an embodiment, the tenant may then request to release the compute zone (thereby allowing the compute zone to be used by another tenant). In another embodiment, the tenant keeps the allocation of the compute zone for use with another workload as long as the tenant is running on the host computing system. In embodiments, the processing of FIGS. 5A and 5B may be repeated for multiple tenants, multiple accelerators, multiple compute zones, multiple workloads, and/or multiple data streams.

Figure 6:
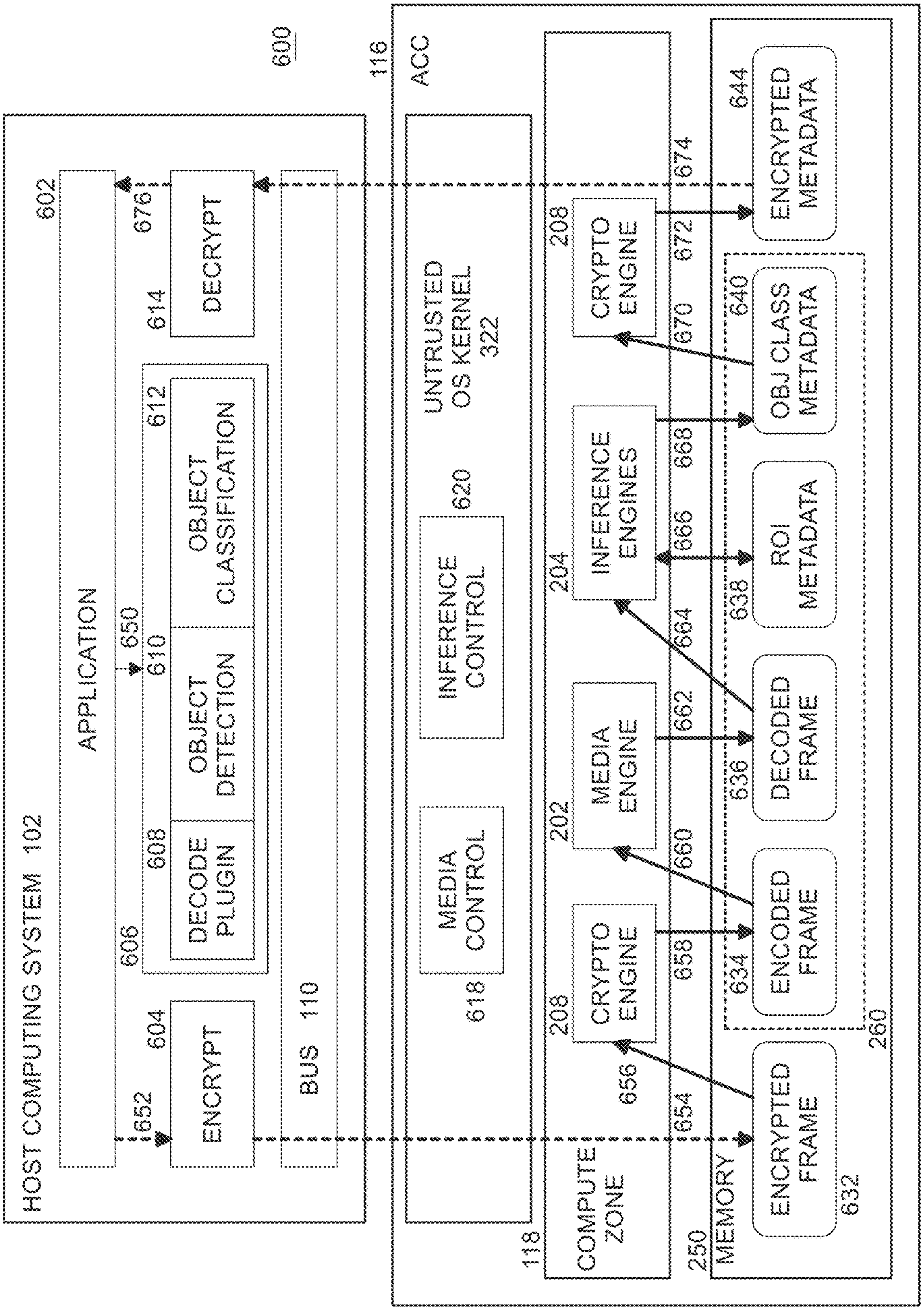
FIG. 6 illustrates a video data stream processing use case for the accelerator according to some embodiments.

FIG. 6 illustrates a video data stream processing use case for accelerator 116 according to some embodiments. Host computing system 102 includes at least one application 602 (e.g., an application such as 406 of a tenant running in a VM 404 (not shown in FIG. 6)). Rather than processing a workload by the application on the host computing system, in an embodiment the application offloads one or more workloads for processing the video data stream to the accelerator (e.g., acc 116) for processing. Application 602 sends the plaintext video data stream over logical data path 652 to be encrypted by encrypt function 604. The application sends the encrypted video data stream over bus 110 to an assigned compute zone in the accelerator (for example, compute 0 118). The compute zone stores one or more encrypted frames 632 of the video data stream logical data path 654 in memory 250. In the processing below, in another embodiment, any one or more portions of the data being processed by accelerator 116 is read from and written to protected regions of temporary memory 252 instead of protected regions of memory 250. The crypto engine of the compute zone (for example, crypto engine 0 208 of compute zone 0 118) reads the one or more encrypted frames 632 from memory 250 over logical data path 656 and decrypts the one or more frames. The crypto engine stores the decrypted but encoded one or more frames in a protected region of memory 250 (for example, protected region 260 of memory 250 for compute zone 0 118) over logical data path 658. The media engine of the compute zone (for example, media engine 0 202 of compute zone 0 118) reads the decrypted but encoded one or more frames 634 from the protected region of memory 250 over logical data path 660 and decodes the one or more frames. The media engine stores the decoded one or more frames 636 in the protected region of memory 250 over logical data path 662. In an embodiment, a media control 618 portion of accelerator OS 616 (for example, trusted OS 306) controls the decoding operations performed by the media engine.

One or more inference engines (such as inference engines 0 204) read the one or more decoded frames 636 from the protected region of memory 250 over logical data path 664. In an embodiment, the one or more inference engines apply a machine learning model to the decoded frames and generate region of interest (ROI) metadata 638, which is stored in the protected region of memory 250 over logical data path 666. The one or more inference engines write object (obj) class metadata 640 to the protected region of memory 250 over logical data path 668. In an embodiment, an inference control 620 portion of untrusted OS kernel 322 controls the inferencing operations performed by the one or more inference engines. In an embodiment, inference control 620 is an application 316 that controls and/or directs the processing of inference engine(s) 204 without having access to sensitive tenant data 634, 636, 638, and 640. In one embodiment, the processing performed by the one or more inference engines is video data stream processing. In other embodiments, the processing may be related to voice data processing, voice recognition, two-dimensional or three-dimensional image classification, pattern recognition, detectors, and the like. In various embodiments, the data being processed may be radar data, acoustic data, sensor data, or any other suitable data.

The crypto engine (such as crypto engine 0 208) reads object class metadata 640 from the protected region of memory 250 over logical data path 670 and encrypts the metadata. The crypto engine stores the encrypted metadata 644 in memory 250 over logical path 672. Accelerator 116 sends encrypted metadata 644 over bus 110 to host computing system 102 over logical data path 674. Decrypt function 614 on the host decrypts the encrypted metadata and forwards the decrypted metadata over logical path 676 to application 602. Application 602 can then use the decrypted metadata as needed.

Decode plugin 608 controls media engine 202, ensuring that the media engine is able to correctly decode encoded frame 634, without having direct access to encoded frame 634 or decoded frame 636. Object detection function 610 triggers inference engine(s) 204 to detect objects present in decoded frame 636, resulting in ROI Metadata 638, without having direct access to decoded frame 636 or ROI Metadata 638. Object classification function 612 also triggers inference engine(s) 204 to classify objects (car, dog, cat, etc.) present in decoded frame 636, resulting in "Label" ROI metadata 638 (such as "car", "dog", "cat"), without having direct access to decoded frame 636 or "Label" ROI metadata 638.

The isolation techniques of embodiments are described above with reference to cloud computing and multi-tenancy scenarios but are also applicable to any distributed processing environments and to a plurality of processing contexts where the contexts trust each other but still need isolation for confidentiality or privacy reasons.

Figure 7:
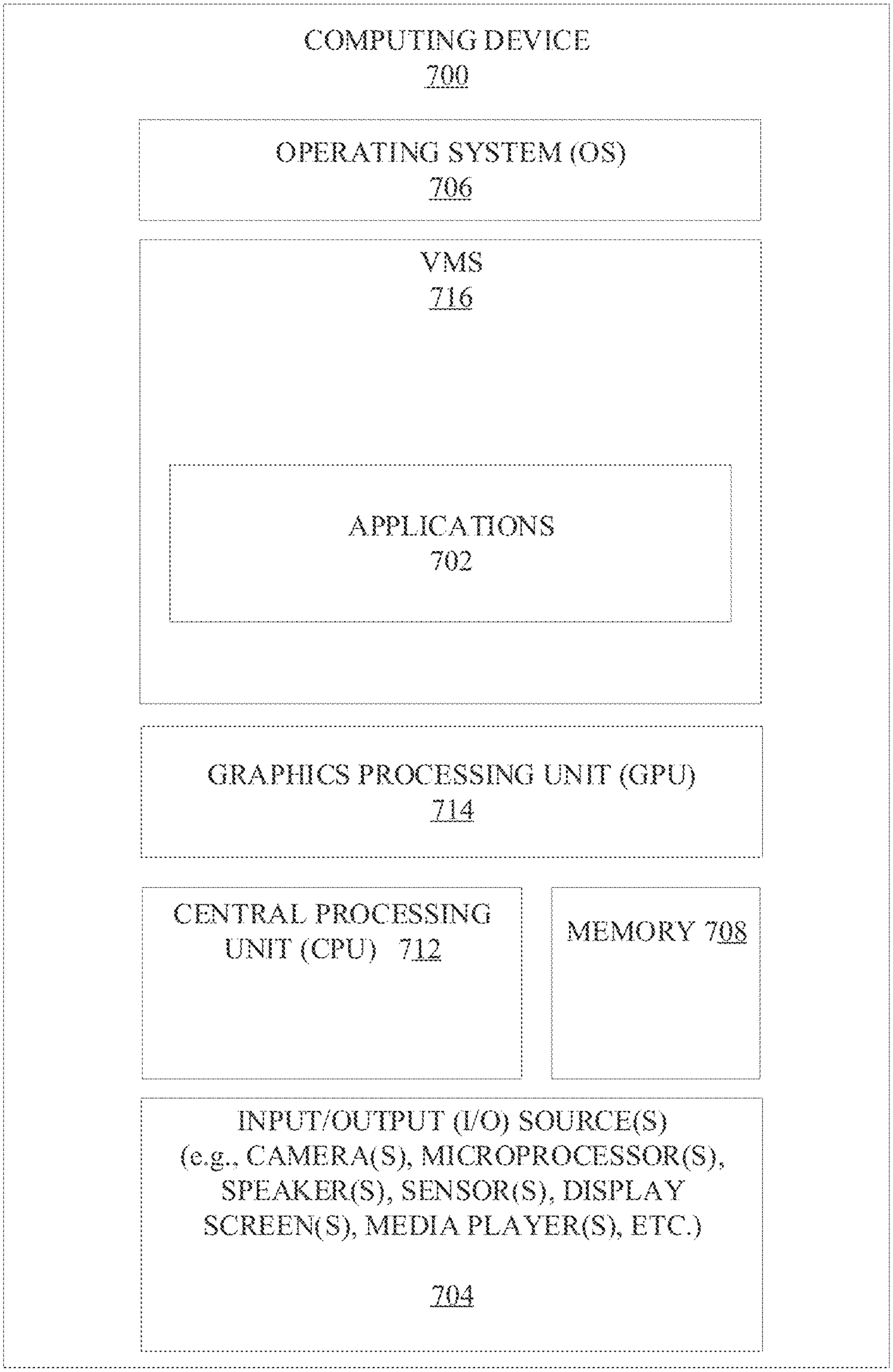
FIG. 7 illustrates a computing device used in multi-tenancy protection, according to an embodiment.

FIG. 7 illustrates one embodiment of a computing device 700 used in multi-tenancy protection (implementing, for example, host computing system 102 or accelerator 116). Computing device 700 as a host computing system executes VMs 716 having one or more tenant applications 702. Computing device 700 may include one or more smart wearable devices, virtual reality (VR) devices, head-mounted display (HMDs), mobile computers, Internet of Things (IoT) devices, laptop computers, desktop computers, server computers, smartphones, etc.

In some embodiments, at least some of host computing system and/or accelerator 116 is hosted by or part of firmware of graphics processing unit (GPU) 714. In yet other embodiments, at least some of host computing system 102 and/or accelerator 116 is hosted by or be a part of firmware of central processing unit ("CPU" or "application processor") 712.

In yet another embodiment, at least some of host computing system and/or accelerator 116 is hosted as software or firmware logic by operating system (OS) 706. In yet a further embodiment, at least some of host computing system and/or accelerator 116 is partially and simultaneously hosted by multiple components of computing device 700, such as one or more of GPU 714, GPU firmware (not shown in FIG. 7), CPU 712, CPU firmware (not shown in FIG. 7), operating system 706, and/or the like. It is contemplated that at least some of host computing system and/or accelerator 116 or one or more of the constituent components may be implemented as hardware, software, and/or firmware.

Throughout the document, term "user" may be interchangeably referred to as "viewer", "observer", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

Computing device 700 may include any number and type of communication devices, such as large computing systems, such as server computers, desktop computers, etc., and may further include set-top boxes (e.g., Internet-based cable television set-top boxes, etc.), global positioning system (GPS)-based devices, etc. Computing device 700 may include mobile computing devices serving as communication devices, such as cellular phones including smartphones, personal digital assistants (PDAs), tablet computers, laptop computers, e-readers, smart televisions, television platforms, wearable devices (e.g., glasses, watches, bracelets, smartcards, jewelry, clothing items, etc.), media players, etc. For example, in one embodiment, computing device 700 may include a mobile computing device employing a computer platform hosting an integrated circuit ("IC"), such as system on a chip ("SoC" or "SOC"), integrating various hardware and/or software components of computing device 700 on a single chip.

As illustrated, in one embodiment, computing device 700 may include any number and type of hardware and/or software components, such as (without limitation) GPU 714, a graphics driver (also referred to as "GPU driver", "graphics driver logic", "driver logic", user-mode driver (UMD), UMD, user-mode driver framework (UMDF), UMDF, or simply "driver") (not shown in FIG. 7), CPU 712, memory 708, network devices, drivers, or the like, as well as input/output (I/O) sources 704, such as touchscreens, touch panels, touch pads, virtual or regular keyboards, virtual or regular mice, ports, connectors, etc.

Computing device 700 may include operating system (OS) 706 serving as an interface between hardware and/or physical resources of the computer device 700 and a user. It is contemplated that CPU 712 may include one or more processors, such as processor(s) 702 of FIG. 7, while GPU 714 may include one or more graphics processors (or multiprocessors).

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

It is contemplated that some processes of the graphics pipeline as described herein are implemented in software, while the rest are implemented in hardware. A graphics pipeline may be implemented in a graphics coprocessor design, where CPU 712 is designed to work with GPU 714 which may be included in or co-located with CPU 712. In one embodiment, GPU 714 may employ any number and type of conventional software and hardware logic to perform the conventional functions relating to graphics rendering as well as novel software and hardware logic to execute any number and type of instructions.

Memory 708 may include a random-access memory (RAM) comprising application database having object information. A memory controller hub (not shown FIG. 7), may access data in the RAM and forward it to GPU 714 for graphics pipeline processing. RAM may include double data rate RAM (DDR RAM), extended data output RAM (EDO RAM), etc. CPU 712 interacts with a hardware graphics pipeline to share graphics pipelining functionality.

Processed data is stored in a buffer in the hardware graphics pipeline, and state information is stored in memory 708. The resulting image is then transferred to I/O sources 704, such as a display component for displaying of the image. It is contemplated that the display device may be of various types, such as Cathode Ray Tube (CRT), Thin Film Transistor (TFT), Liquid Crystal Display (LCD), Organic Light Emitting Diode (OLED) array, etc., to display information to a user.

Memory 708 may comprise a pre-allocated region of a buffer (e.g., frame buffer); however, it should be understood by one of ordinary skill in the art that the embodiments are not so limited, and that any memory accessible to the lower graphics pipeline may be used. Computing device 700 may further include an input/output (I/O) control hub (ICH) (not shown in FIG. 7), as one or more I/O sources 704, etc.

CPU 712 may include one or more processors to execute instructions in order to perform whatever software routines the computing system implements. The instructions frequently involve some sort of operation performed upon data. Both data and instructions may be stored in system memory 708 and any associated cache. Cache is typically designed to have shorter latency times than system memory 708; for example, cache might be integrated onto the same silicon chip(s) as the processor(s) and/or constructed with faster static RAM (SRAM) cells whilst the system memory 708 might be constructed with slower dynamic RAM (DRAM) cells. By tending to store more frequently used instructions and data in the cache as opposed to the system memory 708, the overall performance efficiency of computing device 700 improves. It is contemplated that in some embodiments, GPU 714 may exist as part of CPU 712 (such as part of a physical CPU package) in which case, memory 708 may be shared by CPU 712 and GPU 714 or kept separated.

System memory 708 may be made available to other components within the computing device 700. For example, any data (e.g., input graphics data) received from various interfaces to the computing device 700 (e.g., keyboard and mouse, printer port, Local Area Network (LAN) port, modem port, etc.) or retrieved from an internal storage element of the computer device 700 (e.g., hard disk drive) are often temporarily queued into system memory 708 prior to being operated upon by the one or more processor(s) in the implementation of a software program. Similarly, data that a software program determines should be sent from the computing device 700 to an outside entity through one of the computing system interfaces, or stored into an internal storage element, is often temporarily queued in system memory 708 prior to its being transmitted or stored.

Further, for example, an ICH may be used for ensuring that such data is properly passed between the system memory 708 and its appropriate corresponding computing system interface (and internal storage device if the computing system is so designed) and may have bi-directional point-to-point links between itself and the observed I/O sources/devices 704. Similarly, an MCH may be used for managing the various contending requests for system memory 708 accesses amongst CPU 712 and GPU 114, interfaces and internal storage elements that may proximately arise in time with respect to one another.

I/O sources 704 may include one or more I/O devices that are implemented for transferring data to and/or from computing device 700 (e.g., a networking adapter); or, for a large-scale non-volatile storage within computing device 700 (e.g., hard disk drive). User input device, including alphanumeric and other keys, may be used to communicate information and command selections to GPU 714. Another type of user input device is cursor control, such as a mouse, a trackball, a touchscreen, a touchpad, or cursor direction keys to communicate direction information and command selections to GPU 714 and to control cursor movement on the display device. Camera and microphone arrays of computer device 700 may be employed to observe gestures, record audio and video and to receive and transmit visual and audio commands.

Computing device 700 may further include network interface(s) to provide access to a network, such as a LAN, a wide area network (WAN), a metropolitan area network (MAN), a personal area network (PAN), Bluetooth, a cloud network, a mobile network (e.g., 3rd Generation (3G), 4th Generation (4G), etc.), an intranet, the Internet, etc. Network interface(s) may include, for example, a wireless network interface having antenna, which may represent one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Network interface(s) may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported. In addition to, or instead of, communication via the wireless LAN standards, network interface(s) may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) may include one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing device 700 may vary from implementation to implementation depending upon numerous factors, such as price constraints, performance requirements, technological improvements, or other circumstances. Examples of the electronic device or computer system 700 may include (without limitation) a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parent board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more tangible non-transitory machine-readable media having stored thereon machine-executable instructions that, when executed by one or more machines such as a computer, network of computers, or other electronic devices, may result in the one or more machines carrying out operations in accordance with embodiments described herein. A tangible non-transitory machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Figure 8:
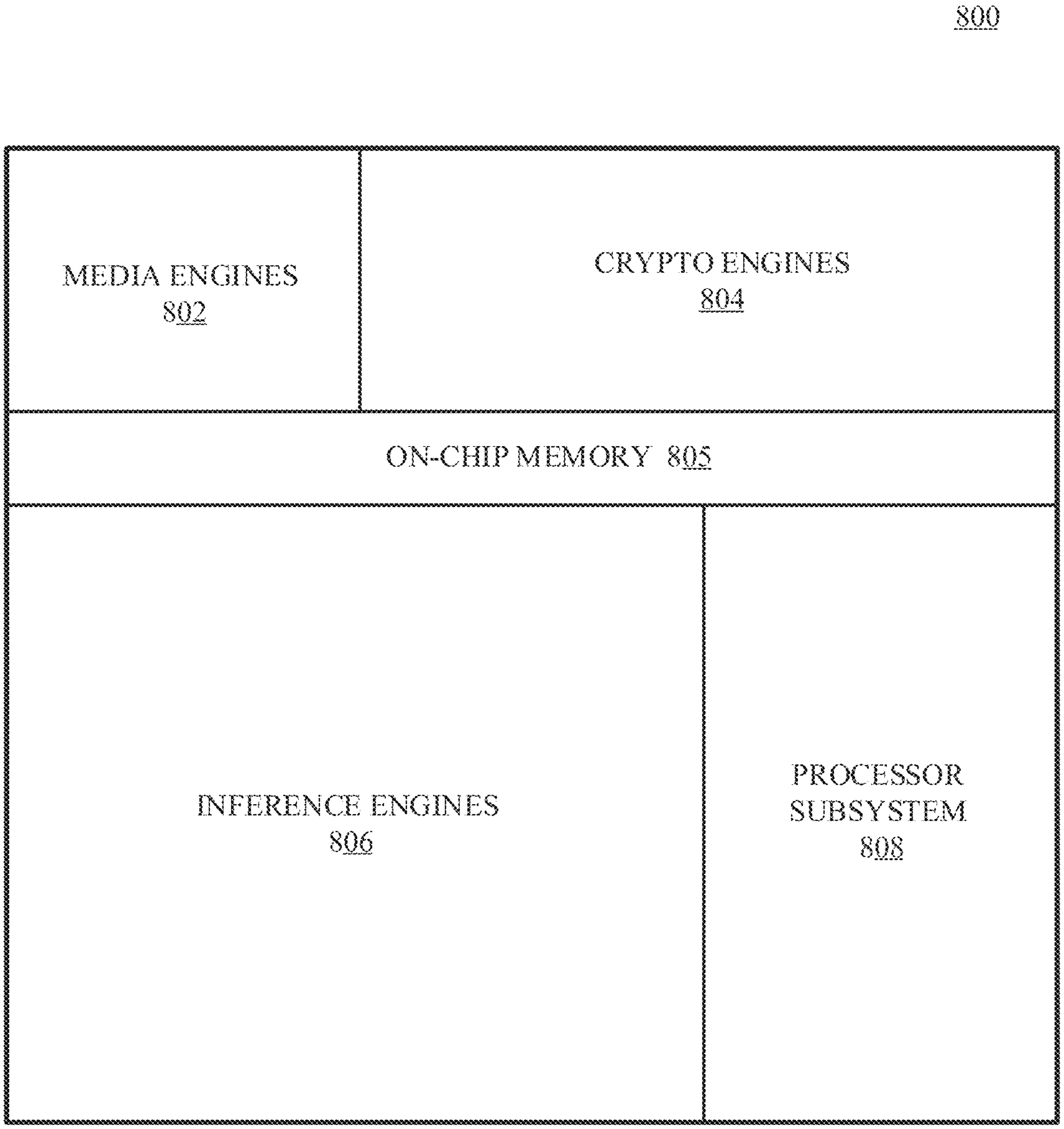
FIG. 8 illustrates an exemplary accelerator system on a chip (SOC) suitable for providing multi-tenancy protection according to some embodiments.

FIG. 8 illustrates an exemplary accelerator system on a chip (SOC) 800 suitable for providing multi-tenant protection according to some embodiments. One or more components of FIG. 8 may be used to implement accelerator 116. The SOC 800 can integrate processing components including one or more media engines 802, one or more crypto engines 804, one or more inference engines 806 and at least one processor subsystem 808. Other components as shown in FIG. 2 are omitted in FIG. 8 for clarity. The SOC 800 can additionally include on-chip memory 805 that can enable a shared on-chip data pool that is accessible by each of the processing components. On-chip memory includes one or more of memory 250 and temporary memory 252 as shown in FIG. 2. The processing components can be optimized for low power operation to enable deployment to a variety of machine learning platforms, including autonomous vehicles and autonomous robots.

During operation, media engines 802, crypto engines 804, and inference engines 806 can work in concert to accelerate computer vision operations or other video data stream processing. Media engines 802 enable low latency decode of multiple high-resolution (e.g., 4K, 8K) video streams. The decoded video streams can be written to a buffer in the on-chip-memory 805. The media engines can then parse the decoded video and perform preliminary processing operations on the frames of the decoded video in preparation of processing the frames using a trained image recognition model (e.g., in inference engines 806). For example, inference engines 806 can accelerate convolution operations for a convolutional neural network (CNN) that is used to perform image recognition on the high-resolution video data, while back end model computations are performed by processor subsystem 808.

The processing subsystem 808 can include control logic to assist with sequencing and synchronization of data transfers and shared memory operations performed by media engines 802, crypto engines 804, and inference engines 806. Processor subsystem 808 can also function as an application processor to execute software applications that make use of the inferencing compute capabilities of the inference engines 806.

Flowcharts representative of example hardware logic, machine readable instructions, hardware implemented state machines, and/or any combination thereof for implementing computing device 700, for example, are shown in FIGS. 5A and 5B. The machine-readable instructions may be one or more executable programs or portion(s) of an executable program for execution by a computer processor such as the processor 714 shown in the example computing device 700 discussed above in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowcharts illustrated in FIGS. 5A and 5B, many other methods of implementing the example system 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine-readable instructions described herein may be stored in one or more of a compressed format, an encrypted format, a fragmented format, a compiled format, an executable format, a packaged format, etc. Machine-readable instructions as described herein may be stored as data (e.g., portions of instructions, code, representations of code, etc.) that may be utilized to create, manufacture, and/or produce machine executable instructions. For example, the machine-readable instructions may be fragmented and stored on one or more storage devices and/or computing devices (e.g., servers). The machine-readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or another machine. For example, the machine-readable instructions may be stored in multiple parts, which are individually compressed, encrypted, and stored on separate computing devices, wherein the parts when decrypted, decompressed, and combined form a set of executable instructions that implement a program such as that described herein.

In another example, the machine-readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine-readable instructions may be configured (e.g., settings stored, data input, network addresses recorded, etc.) before the machine-readable instructions and/or the corresponding program(s) can be executed in whole or in part. Thus, the disclosed machine-readable instructions and/or corresponding program(s) are intended to encompass such machine-readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example process of FIGS. 5A and 5B may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended.

The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

The following examples pertain to further embodiments.

Example 1 is an accelerator. The accelerator of Example 1 includes a memory; a first compute zone to receive an encrypted workload downloaded from a tenant application running in a virtual machine on a host computing system attached to the accelerator; and a processor subsystem to execute a cryptographic key exchange protocol with the tenant application to derive a session key for the first compute zone and to program the session key into the first compute zone. The first compute zone is to decrypt the encrypted workload using the session key, receive an encrypted data stream from the tenant application, decrypt the encrypted data stream using the session key, and process the decrypted data stream by executing the workload to produce metadata.

In Example 2, the subject matter of Example 1 can optionally include wherein the tenant application communicates with the first compute zone over a physical function of a bus coupling the host computing system and the accelerator.

In Example 3, the subject matter of Example 1 can optionally include wherein the accelerator comprises a plurality of compute zones and the first compute zone is isolated from other compute zones in the accelerator.

In Example 4, the subject matter of Example 1 can optionally include wherein a plurality of compute zones and data stored in a protected region of the memory assigned to the first compute zone is isolated from access by other compute zones in the accelerator.

In Example 5, the subject matter of Example 4 can optionally include wherein the first compute zone stores the decrypted data stream and the metadata in the protected region of the memory assigned to the first compute zone.

In Example 6, the subject matter of Example 4 can optionally include wherein the protected region of the memory is assigned to the first compute zone by setting one or more using isolated memory region (IMR) registers in the processor subsystem.

In Example 7, the subject matter of Example 1 can optionally include wherein the first compute zone encrypts the metadata using the session key and sends the encrypted metadata to the tenant application.

In Example 8, the subject matter of Example 1 can optionally include wherein the processor subsystem operates in a trusted execution environment.

In Example 9, the subject matter of Example 1 can optionally include wherein the first compute zone comprises one or more cryptographic engines to perform cryptographic operations on the encrypted workload and the encrypted data stream; one or more media engines to perform media operations on the decrypted data stream, and one or more inference engines to execute the decrypted workload to process the decrypted data stream.

In Example 10, the subject matter of Example 9 can optionally include wherein the one or more inference engines comprise one or more machine learning models.

In Example 11, the subject matter of Example 1 optionally comprising an accelerator embodying the memory, the first compute function and the processor subsystem, as a system on a chip (SoC) attached the host computing system over one or more physical functions of a bus.

In Example 12, the subject matter of Example 11 can optionally include wherein the host computing system comprises a resource manager to detect one or more compute zones in the accelerator, assign at least one physical function to each of the one or more detected compute zones, receive a request to assign the first compute zone to the tenant application, assign the first compute zone to the virtual machine of the tenant application, start the virtual machine, and start the tenant application in the virtual machine.

In Example 13, the subject matter of Example 12 can optionally include wherein the virtual machine comprises a compute zone driver to detect the physical function coupled to the first compute zone and to cause the accelerator to initialize the first compute zone.

Example 14 is a method. The method includes receiving, by a first compute zone of an accelerator, an encrypted workload downloaded from a tenant application running in a virtual machine on a host computing system attached to the accelerator; executing, by a processor subsystem of the accelerator, a cryptographic key exchange protocol with the tenant application to derive a session key for the first compute zone and to program the session key into the first compute zone, decrypting, by the first compute zone, the encrypted workload using the session key; receiving, by the first computer zone, an encrypted data stream from the tenant application; decrypting, by the first compute zone, the encrypted data stream using the session key; and processing, by the first compute zone, the decrypted data stream by executing the workload to produce metadata.

In Example 15, the subject matter of Example 14 can optionally include wherein the accelerator comprises a plurality of compute zones and comprising isolating, by the accelerator, data stored in a protected region of the memory assigned to the first compute zone from access by other compute zones in the accelerator.

In Example 16, the subject matter of Example 14 can optionally include storing, by the first compute zone, the decrypted data stream and the metadata in a protected region of a memory assigned to the first compute zone.

In Example 17, the subject matter of Example 14 can optionally include wherein the first compute zone encrypts the metadata using the session key and sends the encrypted metadata to the tenant application.

Example 18 is at least one non-transitory machine-readable storage medium comprising instructions that, when executed, cause at least one processor to perform receiving, by a first compute zone of an accelerator, an encrypted workload downloaded from a tenant application running in a virtual machine on a host computing system attached to the accelerator; executing, by a processor subsystem of the accelerator, a cryptographic key exchange protocol with the tenant application to derive a session key for the first compute zone and to program the session key into the first compute zone, decrypting, by the first compute zone, the encrypted workload using the session key; receiving, by the first computer zone, an encrypted data stream from the tenant application; decrypting, by the first compute zone, the encrypted data stream using the session key; and processing, by the first compute zone, the decrypted data stream by executing the workload to produce metadata.

In Example 19, the subject matter of Example 18 can optionally include wherein the accelerator comprises a plurality of compute zones and wherein the instructions further include instructions for comprising isolating, by the accelerator, data stored in a protected region of the memory assigned to the first compute zone from access by other compute zones in the accelerator.

In Example 20, the subject matter of Example 19 can optionally include wherein the instructions further include instructions for storing, by the first compute zone, the decrypted data stream and the metadata in a protected region of a memory assigned to the first compute zone.

The foregoing description and drawings are to be regarded in an illustrative rather than a restrictive sense. Persons skilled in the art will understand that various modifications and changes may be made to the embodiments described herein without departing from the broader spirit and scope of the features set forth in the appended claims.

What is claimed is:

1. At least one non-transitory computer-readable medium having stored thereon instructions which, when executed, cause processing circuitry to perform operations comprising:

receiving an encrypted workload from a first tenant application running in a first virtual machine on a host computing system representing application processing circuitry coupled to an accelerator representing the processing circuitry having graphics processing circuitry;

providing a first compute zone associated with the accelerator by executing a first cryptographic key exchange with the first tenant application to derive a first session key for the first compute zone, wherein the accelerator together with a respective tenant application to provide a trusted execution environment (TEE);

receiving encrypted data from the first tenant application, the encrypted data associated with an encrypted session corresponding to the first compute zone;

decrypting the encrypted data using the first session key;

processing the decrypted data to produce process results relating to the decrypted data; and isolating data from access by other compute zones associated with the accelerator.

2. The computer-readable medium of claim 1, wherein the operations further comprise providing a second compute zone associated with the accelerator by executing a second cryptographic key exchange with a second tenant application to derive a second session key for the second compute zone, wherein the second cryptographic key exchange is different from the first cryptographic key exchange.

3. The computer-readable medium of claim 1, wherein the data is isolated and stored in a protected region of a memory assigned to the first compute zone.

4. The computer-readable medium of claim 1, wherein the operations further comprise generating a unique session key associated with the encrypted session such that the first compute zone is isolated from the second and other compute zones, wherein the unique session key is shared by a TEE module associated with the accelerator and the host computing system.

5. The computer-readable medium of claim 1, wherein the first and second compute zones associated the accelerator provide parallel processing.

6. The computer-readable medium of claim 1, wherein the operations further comprise encrypting the process results using the accelerator prior to sending the encrypted process results to the host computing system.

7. The computer-readable medium of claim 6, wherein the process results include classification data, wherein the processing circuitry is coupled to a memory.

8. An apparatus comprising:

processing circuitry having graphics processing circuitry, the processing circuitry to:

receive an encrypted workload from a first tenant application running in a first virtual machine on a host computing system representing application processing circuitry coupled to an accelerator representing the graphics processing circuitry;

provide a first compute zone associated with the accelerator by executing a first cryptographic key exchange with the first tenant application to derive a first session key for the first compute zone, wherein the accelerator together with a respective tenant application to provide a trusted execution environment (TEE);

receive encrypted data from the first tenant application, the encrypted data associated with an encrypted session that corresponds to the first compute zone;

decrypt the encrypted data using the first session key;

process the decrypted data to produce process results relating to the decrypted data; and isolating data from access by other compute zones associated with the accelerator.

9. The apparatus of claim 8, wherein the processing circuitry is further to provide a second compute zone associated with the accelerator by executing a second cryptographic key exchange with a second tenant application to derive a second session key for the second compute zone, wherein the second cryptographic key exchange is different from the first cryptographic key exchange.

10. The apparatus of claim 8, wherein the data is isolated and stored in a protected region of a memory assigned to the first compute zone.

11. The apparatus of claim 8, wherein the processing circuitry is further to generate a unique session key associated with the encrypted session such that the first compute zone is isolated from the second and other compute zones, wherein the unique session key is shared by a TEE module associated with the accelerator and the host computing system.

12. The apparatus of claim 8, wherein the first and second compute zones associated with the accelerator provide parallel processing.

13. The apparatus of claim 8, wherein the processing circuitry is further to encrypt the process results using the accelerator prior to sending the encrypted process results to the host computing system.

14. The apparatus of claim 13, wherein the process results include classification data, wherein the processing circuitry is coupled to a memory.

15. A method comprising:

receiving an encrypted workload from a first tenant application running in a first virtual machine on a host computing system representing application processing circuitry coupled to an accelerator representing graphics processing circuitry;

providing a first compute zone associated with the accelerator by executing a first cryptographic key exchange with the first tenant application to derive a first session key for the first compute zone, wherein the accelerator together with a respective tenant application to provide a trusted execution environment (TEE);

receiving encrypted data from the first tenant application, the encrypted data associated with an encrypted session corresponding to the first compute zone;

decrypting the encrypted data using the first session key;

processing the decrypted data to produce process results relating to the decrypted data; and isolating data from access by other compute zones associated with the accelerator.

16. The method of claim 15, further comprising providing a second compute zone associated with the accelerator by executing a second cryptographic key exchange with a second tenant application to derive a second session key for the second compute zone, wherein the second cryptographic key exchange is different from the first cryptographic key exchange, and wherein the process results include classification data.

17. The method of claim 15, wherein the data is isolated and stored in a protected region of a memory assigned to the first compute zone.

18. The method of claim 15, further comprising generating a unique session key associated with the encrypted session such that the first compute zone is isolated from the second and other compute zones, wherein the unique session key is shared by a TEE module associated with the accelerator and the host computing system.

19. The method of claim 15, wherein the first and second compute zones associated with the accelerator provide parallel processing.

20. The method of claim 15, further comprising encrypting the process results using the accelerator prior to sending the encrypted process results to the host computing system, wherein the processing circuitry is coupled to a memory.

* * * * *